Patented June 1, 1937

2,082,343

UNITED STATES PATENT OFFICE 2,082,343

PROCESS OF OBTAINING ERGOT EXTRACTS

Morris S. Kharasch and Romeo Ralph Legault, Chicago, Ill., assignors to Eli Lilly and Company, Indianapolis, Ind., a corporation of Indiana No Drawing. Application May 26, 1934, Serial No. 727,731

13 Claims. (Cl. 87—28)

Our invention relates to therapeutically active preparations from ergot.

We have discovered that by first making an extract of ergot with a volatile non-aqueous solvent, to obtain a concentrated solid product which has substantially all of the original alkaloids of the ergot but from which the greater part (say 80% to 98%) of the inert matter has been removed, and then extracting this solid concentrate with water, which may if desired be slightly acid or basic although we prefer either pure water or slightly acid water, two distinct physiologically active products are obtained, one in the water extract and the other in the residue therefrom.

Both of these products have physiological properties which distinguish them from hitherto known ergot preparations.

The water solution is effective, as shown by the Moir uterine bag method, when administered either orally or subcutaneously, to produce uterine contractions which are in general typical of ergot but which have a somewhat greater elevation of the base line and cause greater tetany. In the latter respect the effect of the water extract resembles that produced by pituitary extracts, but differs therefrom in having a longer duration.

The solid residue from the water extraction, when administered by mouth, produces very startling effects, for it causes tremendous uterine contractions of great amplitude, and extreme tetany, for a series of short periods interspersed with substantially complete relaxations. By "tetany" we mean a maintenance of a contracted condition, with rhythmic partial relaxations and contractions but with the partial relaxations such that even at the height of a relaxation there is a great contraction.

The initial extraction of the ergot to get a product containing substantially the total ergot alkaloids free from the great bulk of the inert matter co-present with them in ergot may be made in several ways:

The extraction procedure which we prefer is that which is set forth in our co-pending application Serial No. 716,158, filed March 17, 1934, in which we extract the ergot with liquid sulfur dioxide. On evaporation of the sulfur dioxide, and desirably washing the residue with ligroin, this yields a light brown powder which has a weight of about 2% of the original ergot, but which when tested by the colorimetric method of M. I. Smith shows substantially the presence of the total alkaloids of the original ergot.

Instead of liquid sulfur dioxide, we may make the initial extraction with liquid ammonia, ethylene dichloride, acetone, ether, benzene, or any of a number of other non-aqueous solvents of low boiling point, and of similar general character in that they are solvents to a greater or less extent of alkaloids of ergot.

The initial extracts thus obtained vary in weight, in terms of percentage of the original ergot; but, in general, except for the liquid-ammonia extract, are of the order of from 1.5% to 2.0%, while the liquid-ammonia extract is several times heavier than that.

The initial extracts thus obtained are in the form of an amorphous powder, which when tested by the Smith colorimetric method above referred to show an alkaloidal content of from about 6%–15%. The solid surfur-dioxide extract, which we prefer, ordinarily shows about 10% alkaloids. These extracts are physiologically active when tested by the cocks-comb method, the Broom and Clark method, and the Moir method.

The therapeutic oral dose of the solid sulfur-dioxide extract is about 20 milligrams; which means about 2 milligrams of alkaloids. That dose produces ryhthmic uterine contractions as tested by the Moir method, on human mothers, with very little tetany and with substantially complete uterine relaxation between uterine contractions.

The initial ergot extract, desirably the sulfur-dioxide extract but permissibly one of the other non-aqueous solid extracts, is the intermediate product from which we make our water extraction. We give below two procedures for such water extraction:

Procedure A.—One gram of the initial extract, desirably the sulfur-dioxide extract, is triturated with about 3 cc. of 95% ethyl alcohol. The amount of alcohol may vary, bearing in mind that the final extract must be essentially an aqueous extract. Then 50 cc. of distilled water are added, and the whole is shaken in a shaking machine for about four hours, desirably with glass beads added to the mixture. The mixture is then filtered. The filtrate is reserved, and the residue is returned to the container. Then 40 cc. of distilled water is added, and the shaking is repeated for about three hours; and the mixture is filtered. The second filtrate is combined with the first; and the residue is washed with enough water to make the total combined filtrates 100 cc. At this stage the combined filtrate ordinarily appears colloidal; but by filtration through very fine filter paper it may be rendered practically free of colloidal matter. In thick layers, this preparation has a light yellow color, but is practically colorless in thin layers; and what color there is may be removed by adding a small quantity of an electrolyte, such as NaCl, shaking with chalk, and filtering.

*Procedure B.*—Procedure B is substantially the same as Procedure A, save that the initial trituration with alcohol is omitted. However, we prefer Procedure A, because the presence of alcohol facilitates the process.

Since the final volume of the water extract is 100 cc., each cc. represents the material extracted from ten milligrams of the solid sulfur-dioxide extract; and since the sulfur-dioxide extract contained about 10% alkaloids, each cc. of the water extract thereof should contain one milligram of alkaloids if all the alkaloids of the sulfur-dioxide extracts were taken up by the water. However, by the Smith colorimetric method, the water extract is found to contain less than 0.05 mg. of alkaloids per cc., or less than 1/20 of the alkaloids of the solid sulfur-dioxide extract.

Yet when this water extract is administered orally to human mothers, and the uterine contractions observed by the Moir method, it is found that doses of 2 cc. of the water extract produce an effect commensurate with that produced by 20 mg. of the solid sulfur-dioxide extract. In other words, a quantity of the water extract containing not more than 0.1 mg. (0.05 mg. per cc.) of alkaloids produces an effect commensurate with that produced by a quantity of the solid sulfur-dioxide extract containing at least twenty times as much alkaloids, or 2 mg.

The water extract is effective on either oral or subcutaneous administration to human mothers, to produce uterine contractions as determined by the Moir method, in amounts which contain not to exceed 10%, and which are usually less than 5%, as much alkaloids, as determined by the Smith colorimetric method, as is present in the dose of ergotamine tartrate necessary to produce such contractions.

The uterine contractions which are produced by the orally administered water extract, or by corresponding doses subcutaneously administered, although in general commensurate with those produced by the initial solid sulfur-dioxide extract in the doses named, are quite different in character. The solid sulfur-dioxide extract produces little or no tetany, but causes practically complete relaxations between uterine contractions. The water extract, on the other hand, produces contractions of greater amplitude than those caused by the sulfur-dioxide extract, with marked tetany (only incomplete relaxations between the uterine contractions so that there is a distinct elevation of the base line). This effect is in general similar to that produced by pituitary extracts, save that it is of much longer duration. Further, the water extract is more quickly effective than is the solid sulfur-dioxide extract; for the former acts in about ten minutes after oral administration while the latter requires about twenty minutes.

If the initial extract from which the water extract was made is the solid sulfur-dioxide extract, the final water-extract ordinarily has a hydrogen ion concentration of about pH 3.5. If the initial extract was an acetone extract, the final water extract ordinarily has a hydrogen ion concentration of about pH 5.6. In general, the hydrogen ion concentration is on the acid side, but varies in accordance with the initial extract used.

The water extract has a reduced surface tension. In consequence, if the water extract is shaken, it foams quite readily; and the foam persists for some time. This is most noticeable with the water extract of the sulfur-dioxide extract; but is noticeable, although to a less marked degree, with the water-extract of the ethylene-dichloride extract, of the ether extract, and of the acetone extract, in the approximate order of their ability to foam. It seems possible that there is a relation between this foaming ability and clinical activity; for the water extract of the sulfur-dioxide extract is both the most active clinically and foams the most readily on shaking. The water extract of the ethylene-dichloride extract is somewhat less active physiologically and on shaking foams somewhat less readily, and the water extract of the acetone extract is still less active clinically and foams still less readily.

Although in the concentrations given the water extract of the solid sulfur-dioxide extract contains only about 0.05 mg. of alkaloids per cc., it contains about 0.8 mg. of total solids per cc. We believe that this water extract contains something which is clinically active with an ergot action but which the aforesaid Smith colorimetric method does not show to be alkaloidal in character.

The water extract may be evaporated to dryness, under vacuum, and the residue is found to have substantially the full physiological activity of the solution. Such residue may be readily redissolved in water. The complete activity of the water solution may be completely adsorbed on charcoal, and partially but not completely adsorbed on fuller's earth; but apparently is not adsorbed to any appreciable extent on chalk or talc.

Although the water solution has an effectiveness which is in general commensurate with and somewhat similar to that of the initial extract from which it was derived, (solid sulfur-dioxide extract or solid ethylene-dichloride extract or solid acetone extract for instance), the residue remaining after the water extraction is also clinically active. The activity of this residue is startingly different from the activities of the original ergot, of the initial extract thereof, and of the water solution.

Such residue, when tested by the Smith colorimetric method already referred to, has about 6% to 8% of alkaloids; so that its percentage content of alkaloids, as indicated by the Smith method is less than that of the initial solid extract, such as the solid sulfur-dioxide extract.

When such residue is administered by mouth, in doses of 15–20 mg., (so that the alkaloids indicated to be present do not exceed the 2 mg. which are indicated as present in the 20 milligram dose of the solid sulfur-dioxide extract) very extreme uterine contractions were produced. The amplitude of the contractions was of the order of 4 to 6 times that of the contractions produced by similar doses of the solid sulfur-dioxide extract; and 2 to 3 times that of the contractions produced by 2 cc. doses of the water solution. With the uterus held violently contracted, there are slight relaxations and contractions (tetany) with a greatly elevated base line; and groups of these partial relaxations and re-contractions, or periods of tetany, alternate with complete relaxations. The complete-relaxation periods are usually of about 2–3 minutes' duration, while the periods of tetany are usually of about 4–7 minutes' duration.

These violent contractions of the uterus, as induced by this residue from the water extraction of the solid sulfur-dioxide extract of ergot, are not those characteristics of ergot and ergot preparations; but are something quite strikingly and surprisingly different.

Both our water solution and our residue from the water extraction are substantially odorless and tasteless. In that respect they are markedly different from U. S. P. extracts of ergot. In addition, the water solution is substantially without residual color, and is substantially water-clear.

We claim as our invention:

1. The process of producing a therapeutically active extract from ergot, which consists in extracting ergot with a low-boiling non-aqueous solvent of ergot alkaloids, separating the extract so obtained from the solid residue of the initial ergot, evaporating the solvent from said extract to leave a solid residue, and extracting said last-named solid residue with water and separating the water solution so obtained from what remains.

2. The process of producing a therapeutically active extract from ergot, which consists in extracting ergot with liquid sulfur-dioxide, separating the extract so obtained from the solid residue of the initial ergot, evaporating the solvent from said extract to leave a solid residue, and extracting said last-named solid residue with water and separating the water solution so obtained from what remains.

3. The process of producing a therapeutically active extract from ergot, which consists in extracting ergot with ethylene dichloride, separating the extract so obtained from the solid residue of the initial ergot, evaporating the solvent from said extract to leave a solid residue, and extracting said last-named solid residue with water and separating the water solution so obtained from what remains.

4. The process of producing a therapeutically active extract from ergot, which consists in extracting ergot with acetone, separating the extract so obtained from the solid residue of the initial ergot, evaporating the solvent from said extract to leave a solid residue, and extracting said last-named solid residue with water and separating the water solution so obtained from what remains.

5. The process of producing a therapeutically active extract from ergot, which consists in extracting ergot with a low-boiling non-aqueous solvent of ergot alkaloids, separating the extract so obtained from the solid residue of the initial ergot, evaporating the solvent from said extract to leave a solid residue, extracting said last-named solid residue with water and separating the water solution so obtained from what remains, and treating the water solution with an adsorbent of the class consisting of chalk and talc.

6. The process of producing a therapeutically active extract from ergot, which consists in extracting ergot with liquid sulfur-dioxide, separating the extract so obtained from the solid residue of the initial ergot, evaporating the solvent from said extract to leave a solid residue, extracting said last named solid residue with water and separating the water solution so obtained from what remains, and treating the water solution with an adsorbent of the class consisting of chalk and talc.

7. The process of producing a therapeutically active extract from ergot, which consists in extracting ergot with a low-boiling non-aqueous solvent of ergot alkaloids, separating the extract so obtained from the solid residue of the initial ergot, evaporating the solvent from said extract to leave a solid residue, extracting said last-named solid residue with water and separating the water solution so obtained from what remains, and preserving the water extract so obtained.

8. The process of producing a therapeutically active extract from ergot, which consists in extracting ergot with a low-boiling non-aqueous solvent of ergot alkaloids, separating the extract so obtained from the solid residue of the initial ergot, evaporating the solvent from said extract to leave a solid residue, extracting said last-named solid residue with water and separating the water solution so obtained from what remains, and preserving the residue remaining after the water extraction.

9. The process of producing a therapeutically active extract from ergot, which consists in extracting ergot with a low-boiling non-aqueous solvent of ergot alkaloids, separating the extract so obtained from the solid residue of the initial ergot, evaporating the solvent from said extract to leave a solid residue, extracting said last-named solid residue with water and separating the water solution so obtained from what remains, and preserving both the water extract and the residue thereof for producing separate and distinct physiological effects thereby.

10. The process of producing an effective ergot preparation, which consists in extracting ergot with sulfur dioxide, separating the extract so obtained from the solid residue of the initial ergot, evaporating the sulfur dioxide from said extract to leave a solid residue, and treating such last-named residue with water and separating the water solution so obtained from what remains.

11. The process of producing a therapeutically active extract of ergot as set forth in claim 2, with the addition of the step of evaporating the water solution to dryness to obtain a solid residue therefrom.

12. The process of producing a therapeutically active extract of ergot as set forth in claim 10, with the addition of the step of evaporating the water solution to dryness to obtain a solid residue therefrom.

13. The process of producing a therapeutically active extract from ergot, which consists in extracting ergot with a low-boiling non-aqueous solvent of ergot alkaloids, and separating the extract so obtained from the solid residue, by evaporation and water-addition substituting water for the original non-aqueous solvent and thereby producing a fractionation into a water-insoluble portion and a portion which is in solution in the water, and separating the water solution from the water-insoluble portion.

MORRIS S. KHARASCH.
ROMEO R. LEGAULT.

CERTIFICATE OF CORRECTION.

Patent No. 2,082,343.   June 1, 1937.

MORRIS S. KHARASCH, ET AL.

It is hereby certified that error appears in the printed specification of the above numbered patent requiring correction as follows: Page 2, second column, line 45-46, for "startingly" read startlingly; and that the said Letters Patent should be read with this correction therein that the same may conform to the record of the case in the Patent Office.

Signed and sealed this 24th day of August, A. D. 1937.

Leslie Frazer (Seal)   Acting Commissioner of Patents.